United States Patent [19]

Burgoyne, Jr. et al.

[11] Patent Number: 4,845,291
[45] Date of Patent: * Jul. 4, 1989

[54] CYCLOALKENYL ARYLDIAMINES

[75] Inventors: William F. Burgoyne, Jr., Allentown; Dale D. Dixon, Kutztown, both of Pa.

[73] Assignee: Air Products and Chemicals, Inc., Allentown, Pa.

[*] Notice: The portion of the term of this patent subsequent to Dec. 22, 2004 has been disclaimed.

[21] Appl. No.: 946,565

[22] Filed: Dec. 24, 1986

[51] Int. Cl.$^4$ .................................. C07C 87/455
[52] U.S. Cl. ............................. 564/307; 564/305
[58] Field of Search ........................ 564/305, 307

[56] References Cited

U.S. PATENT DOCUMENTS

| | | | |
|---|---|---|---|
| 2,403,963 | 7/1946 | Axe | 585/435 |
| 2,471,922 | 5/1949 | Axe | 585/435 |
| 2,843,565 | 7/1958 | Christenson et al. | 528/152 |
| 3,428,610 | 2/1969 | Klebert | 528/64 |
| 3,865,889 | 2/1975 | Mitchell | 585/435 |
| 4,218,543 | 8/1980 | Weber et al. | 521/51 |
| 4,440,952 | 4/1984 | Ihrman | 564/305 |
| 4,529,746 | 7/1985 | Markors | 521/159 |
| 4,714,778 | 12/1987 | Burgoyne, Jr. et al. | 564/305 |

FOREIGN PATENT DOCUMENTS

| | | | |
|---|---|---|---|
| 0082258 | 8/1982 | European Pat. Off. | |
| 0205317 | 12/1986 | European Pat. Off. | 564/305 |
| 1079628 | 4/1960 | Fed. Rep. of Germany | 564/307 |

Primary Examiner—Glennon H. Hollrah
Assistant Examiner—Susan P. Treanor
Attorney, Agent, or Firm—Russell L. Brewer; James C. Simmons; William F. Marsh

[57] ABSTRACT

This invention relates to a class of alkenylated toluenediamines and phenylenediamines having at least one alkenyl group ortho to an amine group. More particularly the aryldiamines are represented by the formula:

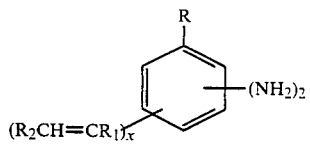

wherein R is hydrogen or $C_1$-$C_3$ aliphatic, $R_1$ is hydrogen, $R_2$ is $C_2$-$C_4$, aliphatic and $R_1$ and $R_2$ form an alkylene radical $(CH_2)_y$ wherein $y=3$ or 4, and x is one or two.

The above described alkenylated aryldiamine, hereafter referred to as diamino-$\beta$-alkyl styrenes, have been found to be well suited as antioxidants and as tri- and tetra functional chain extenders in forming polyurethane/urea elastomers systems and for providing pendant unsaturation for post curing and polymerization.

2 Claims, No Drawings

CYCLOALKENYL ARYLDIAMINES

TECNNICAL FIELD

This invention pertains to alkenylated aryldiamines, also known as diamino-α-alkylstyrenes, having particular suitability for antioxidant use and for post curable, cross-linkable polyurethane/urea elastomer systems.

BACKGROUND OF THE INVENTION

Alkylated diamines have been known for a substantial period of time and find use in the preparation of polyurethane elastomers. The diamines are typically used in that form as chain extenders for polyurethanes, i.e., forming a short chain urea linkage to strengthen the elastomer. As is known, the alkyl group alters the reactivity of the amine thus giving the composition unique processing properties for producing polyurethane elastomers.

A secondary use for the alkylated diamine products is in the manufacture of diisocyanates which are also suited for the synthesis of polyurethane elastomers. They can also be used for plasticizers, or as intermediates for the manufacture of pesticides and alkyd resin modifiers.

Two types of synthesis techniques have been used to produce alkylated aromatic amines, such as, an alkylated toluenediamine. One of the earliest techniques used to prepare an alkylated aromatic diamine employed a Friedel-Crafts alkylation of an aromatic hydrocarbon, then dinitration of the alkylated aromatic hydrocarbon followed by reduction of the nitro groups to amine groups. The diamine could be converted to the diisocyanate by reaction with phosgene. Another technique for producing an alkylated aromatic amine involved nitration of an aromatic hydrocarbon, followed by reduction to the amine and then alkylation of the amine.

Representative patents illustrating various alkyl aromatic diamines and derivatives thereof are as follows:

U.S. Pat. Nos. 3,428,610 and 4,218,543 disclose the use of alkylated toluenediamines in the manufacture of polyurethane resins with the '543 patent showing its use in RIM manufacturing techniques. Alkylated diamines include 1-methyl-3,5-diethylphenylene-2,4-diamine and 1,3,5-trimethylphenylene-2,4-diamine. The diethyltoluenediamine derivative is best known and is referred to as diethyl TDA or DETDA and is probably the most widely used alkylated aromatic diamine for RIM manufacture.

U.S. Pat. No. 4,440,952 shows the synthesis of 1-methyl-2,4-diamino-5-isopropylbenzene and 1-methyl-2,6-diamino-3-isopropylbenzene and the use of the 2,6-isomer as a chain extender for polyurethanes.

European Pat. No. 0069286 discloses various alkyl-substituted phenylenediamines as chain extenders for the production of polyurethanes by reaction injection molding techniques. Some of the compositions suggested as being suited for such use include the 1,3-dimethyl-5-tert-butyl-2,6-diaminobenzene, 2-methyl-4,6-di-tert-butyl-1,3-diaminobenzene, 1,3-dimethyl-5-tert-amyl-2,4-diaminobenzene or its equivalent.

U.S. Pat. No. 4,529,746 discloses the synthesis of $C_{1-4}$ alkylated vicinal toluenediamines and their use as extenders for the preparation of polyurethane-polymer elastomers. The example shows an ethylated vicinal toluenediamine.

Aromatic compositions having unsaturated organo substituents are known and have been prepared by alkylation of aromatic compositions with diolefins. Some patents which show the manufacture of aromatic compositions having unsaturated organo substituents include:

U.S. Pat. No. 2,403,963 which discloses the reaction of benzene and butadiene in the presence of a boron trifluoride catalyst. Phenylbutenes are produced.

U.S. Pat. No. 2,471,922 discloses that aromatic hydrocarbons, which include phenols and aromatic halides, can be reacted with 1,3-diolefins to produce alkenyl derivatives. Examples of low-boiling 1,3-diolefins which can be used in the alkenylation include 1,3-butadiene, 1,3-pentadiene and so forth. Catalyst systems included boron trifluoride and boron trifluoride-phosphoric acid systems.

U.S. Pat. No. 3,865,889 discloses the preparation of an alkenylated aromatic hydrocarbon such as those obtained by reacting butadiene with an alkylbenzene, e.g., toluene or xylene. An alkali metal promoter is used to catalyze the reaction.

U.S. Pat. No. 2,843,565 discloses the production of butenyl-phenol-aldehyde resins which involves the reaction of an alkenylphenol, with formaldehyde. Conjugated dienes such as piperylene, cyclopentadiene, 1-chloro-2-methyl-butadiene are reacted with phenols in the presence of phosphoric acid catalyst and the reaction product then reacted with formaldehyde.

West German 1,079,628 discloses the preparation of cyclopentenyl-substituted aromatic amines by reacting cyclopentadiene at elevated temperature in the presence of bleaching earth with primary, secondary or tertiary aromatic amine substrates. Aniline, N-methylaniline, chloroaniline, and phenylenediamine are suggested candidates.

European Pat. No. 0082258 discloses various meta-phenylenediamines with one or two benzyl rings having lower reactivity due to steric hindrance. Steric hindrance is effected through the use of an aromatic substituent which also may be substituted with various groupings. An example of an amine is 4,6-bis (α,αdimethylbenzyl)-1,3-phenylenediamine prepared by reacting 2-methylstyrene with meta-phenylenediamine.

SUMMARY OF THE INVENTION

This invention pertains to aryldiamines, especially alkenylated toluenediamine and derivatives thereof and particularly to mono-alkenylated toluenediamine. In contrast to prior art aromatic diamine compositions, the organo group contains carbon-carbon unsaturation in conjugated relationship (α,β) to the ring and is readily polymerizable with amine-reactive difunctional condensation monomers such as dicarboxylic acids and their esters, diisocyanates, dianhydrides, and diepoxides and also polymerizable with other unsaturated monomer systems. These aromatic diamine compositions are represented by the formula:

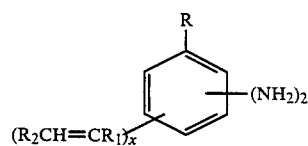

wherein R is hydrogen or $C_1-C_3$ aliphatic, $R_1$ is hydrogen, $R_2$ is $C_2-C_4$, aliphatic and $R_1$ and $R_2$ form an alkylene radical $(CH_2)_y$ wherein $y=3$ or 4, and $x$ is one or two.

There are several advantages associated with the specific compositions of this invention and these advantages include:

- an aryldiamine composition which has an unsaturated organo group ortho to an amino, for providing antioxidant activity for rubber and hydrocarbons such as fuels and oils;
- an aryldiamine composition having antioxidant characteristics that provides for attachment of organic radicals or polymers at one or both nitrogens and allows for tailoring of the solubility characteristics;
- an aryldiamine composition which can have an unsaturated organo group ortho to an amine for providing desirable reactivity for reaction injection molding (RIM) of urethane and polyurea elastomer systems;
- alkenylated aryldiamines which can be converted to aromatic diisocyanates having a carbon-carbon unsaturation for producing unique properties in polyurethane and polyurea resin systems, latexes, UV curable coatings and adhesives and as reactive diluents for polyesters;
- an ability to form polyurethane-urea elastomers systems, either through the diamine functionality or isocyanate functionality, if converted;
- an ability to produce a variety of resin systems, e.g., polyurethane systems; and the condensation polymers such as polyamides, polyimides, polyesters, and polyethers; and
- an ability to effect reaction between various resin systems and polymerizable monomers and thereby introduce monomer groups for desirable end properties.

DETAILED DESCRIPTION OF THE INVENTION

The compounds of this invention, as indicated above, are represented by the formula:

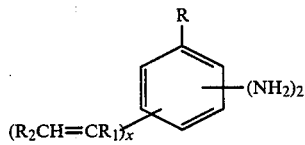

wherein R is hydrogen or $C_1$-$C_3$ aliphatic, $R_1$ is hydrogen, $R_2$ is $C_2$-$C_4$, aliphatic and $R_1$ and $R_2$ form an alkylene radical $(CH_2)_y$ wherein $y=3$ or 4, and $x$ is one or two.

The structural formula has been written to reflect that stereo chemistry exists in the reaction product and $R_2$ may be cis or trans to $R_1$.

The compounds of this invention are synthesized by first alkylating an aromatic diamine, e.g., toluenediamine with a conjugated diene having from 4 to about 12 carbon atoms and then isomerizing the double band by treatment with a solid or liquid phase base. It is because the alkenylation is effected via the amino group that one is able to introduce at least one alkenyl group in a position ortho to an amine group and achieve unique results associated with the specific regiochemistry associated with those isomers. These unique properties include antioxidant characteristics and, urethane processability characteristics.

Much of the art describing the manufacture of alkenylated aromatic hydrocarbons uses a homogeneous catalyst system, e.g., boron trifluoride or boron trifluoride-phosphoric acid mixture or weakly acidic heterogenous catalyst systems. Other art in the manufacture of alkylated aromatic amines uses bleaching earths, clays, montmorillonite and alkali metal ion exchanged zeolites. In contrast to the prior art method for producing alkenylated phenols and alkylated aromatic amines, it is our belief alkenylated aromatic amines are best prepared using silica-alumina or crystalline molecular sieves which are solid phase and have an acidity factor of at least 0.3 and preferably in excess of 0.8 as the catalyst. The acidity factor is a measurement of acidity of the zeolite catalyst and involves contact of the catalyst with ammonia under adsorption conditions followed by desorption. More particularly, one gram of catalyst is contacted with ammonia at room temperature and then desorbed by heating to a temperature from ambient to 200° C. at a rate of 10° per minute, then holding at 200° C. for two hours. The amount of ammonia irreversibly adsorbed by one gram at 200° C. is indicative of acidity and indicative of the strength of the amine/acid bond. The acidity factor then is the amount of ammonia irreversibly adsorbed expressed in millimoles per gram of catalyst at 200° C. and as stated this level should be at least 0.3 and preferably 0.8 millimoles ammonia per gram of catalyst.

Zeolites which can be utilized for alkenylation of aryldiamines include X, Y, faujasite, ferrierite, offretite, chabazite, gmelinite, erionite, ferrierite, mordenite and the ZSM family. When initially prepared, the cation in the crystalline molecular sieve is an alkali metal, typically sodium. This ion must be exchanged in sufficient proportion, usually, 60% or greater, with an acidic ion such as a rate earth metal, e.g., lanthanum, praseodymium; hydrogen or some of the transition metals such as nickel, copper, chromium and the like. The substitution of various ions for the sodium ion alters the acidity of crystalline molecular sieve, thus making it more reactive and catalytically effective for ring alkenylation of the aromatic amine.

The naturally occurring and synthetic zeolites used in the process normally have a silica to alumina molar ratio from about 2 to 25:1. However, if the silica to alumina ratio is low or acidity borders on the low side of that desired, the silica to alumina ratio and acidity of the zeolite may be altered by a technique called dealumination. In effect, the practice of dealumination decreases the alumina content in the zeolite thereby increasing the silica to alumina ratio. The removal of alumina from the internal structure affects acidity and may also enlarge the cage structure or pore size of the zeolite to permit entry of and diffusion of larger molecules into its internal structure. Thus, one may be able to utilize a particular cation in a dealuminated zeolite, but not use the same cation in its non-dealuminated state. This is because the original cation may not have provided sufficient acidity for effecting ring alkenylation of aryldiamine. Some of the techniques for dealumination include chelation, dehydration or acidification, the latter entailing the treatment of the zeolite with an inorganic acid. Techniques suited for dealumination of zeolites are well known.

Zeolites and crystalline molecular sieves are porous materials with the pores having generally uniform molecular dimensions. Cavities or cages are formed in this zeolite or molecular seive and connected by channels of generally defines diameter. For the practice of this invention the pore diameter should be sufficiently large to permit the molecules to effectively enter the interior of the molecular sieve for reaction and to exit as final product. Typically, the pore size will range from about 6 to 15 Angstroms, but the size of a pore required for reaction can vary depending upon the product being produced. If conversion levels appear low for the particular catalyst, that level may be due to reactant diffusion resistance through the molecular seive. If that is the case, a molecular sieve of slightly large pore size should be tried.

Molecular seives have been developed which have been defined as nonzeolites but have a cage structure that performs similar to zeolites. In many cases, they contain alumina and silica in combination with other components, e.g., phosphorus, boron, germanium, titanium, etc. In the alkenylation of toluenediamines as described here, they perform similarly to zeolites, and representative crystalline molecular sieves are described in U.S. Pat. No. 4,440,871; European Pat. No. 124,119 and European Pat. No. 121,232 and the subject matter of these patents incorporated by reference. Borosilicate and borogermanate zeolites, although not disclosed in these patents, possibly can also be used. For purposes of practicing this invention, ie., in the production of alkenylated toluenediamines, molecular seives are deemed equivalent to and included as catalyst material.

The aromatic amines used in the alkenylation reaction are ortho, meta, and para phenylenediamines and toluenediamine and substituted derivatives. The toluenediamine isomers include the 2,4-; 2,6-; and the 2,3 and 3,4-vicinal toluenediamine derivatives. The methyl radical is in the one position. The alkenylated toluenediamines are prepared by reacting toluenediamine with a diolefin in the presence of an acidic solid phase catalyst, particularly the crystalline molecular seives as described. The initially formed α,γ-unsaturated product is further treated with base at elevated temperatures to provide the preferred α,β-unsaturated product. Useful bases for this conversion include Group II metal oxides such as calcium and magnesium oxide, basic hydroxides such as sodium or potassium hydroxide and Group I metal alkyloxides. When the reaction is carried out at temperature from 75° to 220° C., the isomerization occurs readily in the presence of such base.

Diolefins useful in this invention are acyclic and cyclic conjugated dienes. Examples of some dienes are 1,3-butadiene, isoprene, piperylene, 2,4-hexadiene, 2-phenyl-1,3-butadiene, cyclopentadiene, dicyclopentadiene and methylcyclopentadiene.

Some preferred compositions are listed below.

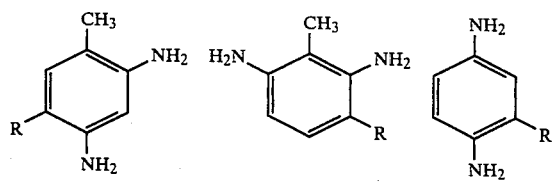

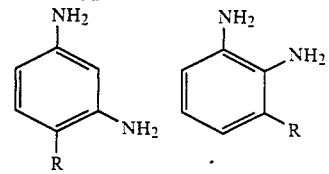

Where R = —CH=CH—CH$_2$CH$_3$

—CH=CH—CH(CH$_3$)$_2$

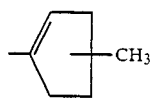

Ring alkenylation of the aryldiamines is effected by reacting toluenediamine with the diolefin at temperatures ranging from about 100 to 250° C. and preferably from about 140° to 220° C. The pressures will range from about 15 to 2000 psig and generally in the range of 100 to 1000 psig. It is common practice to alter the temperature and the pressure within the above ranges specified to optimize selectivity and conversion to the desired product. Mole ratios of olefin to aryldiamine used in the reaction will range from about 1:5 to 10:1 and the reaction time will generally be from about 2 to 48 hours when synthesized in an autoclave or within 0.05 to 6 1/hr, expressed as a liquid hourly space velocity (LHSV) for fixed bed continuous operation.

In the ring alkenylation of aryldiamines utilizing the solid acid catalyst systems the diolefins, and particularly the olefins having conjugated unsaturation, tend to polymerize and generate substantial amounts of by-product polymer. In many cases the combination of reactant and catalyst preclude the formation of alkenylated aryldiamine and substantially all of the olefin is converted to by-product polymer. Butadiene and cyclopentadiene are two offenders and both polymerize readily under the reaction conditions providing low yields of ring alkenylation. To avoid polymer production it is necessary to carry out the ring alkenylation of toluenediamine in the presence of a solvent which is inert to reaction with aryldiamine or the olefin and does not promote polymerization. Solvents which can be best utilized generally include paraffins such as pentane, hexane, heptane, octane, decane; toluene and xylene, paraffinic naphta fractions, kerosene; and cycloparaffin hydrocarbons having from about 5 to 10 carbon atoms, e.g., cyclohexane and so forth. Other inert solvents, especially ethers such as dioxane or tetrahydrofuran, may be effectively used.

The desired diamino-α-alkylstyrenes are obtained by treating the initially formed α,γ-unsaturated alkenyl arylamine with solid or liquid phase base at elevated temperature. The double bond isomerization may be brought about in a temperature range from about 75° C. to 250° C. and preferably from about 120°–220° C. The reaction is desirably conducted at atmospheric conditions though increased pressure should not interfere with the isomerization. The base is used in catalytic quantities, e.g. usually 1 to 10% by weight of the alkenyl arylamine and the transformation is not significantly influenced by the ratio of alkenylated arylamine to base catalyst.

If the product is an alkenylated toluenediamine, the diamine may be used as pure isomers or as a mix for example in the form of the 2,4- and 2,6-diamine isomer mix or in conjunction with a small amount of the alkenylated vicinal toluenediamine derivatives. A mixture of the 2,4-isomer and 2,6-isomer, in a weight ratio from about 65–80% of the 2,4- and 20–35% of the 2,6-isomer, is attractive for a number of reasons. One reason is that a commercial feedstock of toluenediamine typically contains 80% of the 2,4-isomer and 20% of the 2,6-isomer. If separation of the 2,4 and 2,6-isomers from the vinical toluenediamine isomers is not effected, then from about 2 to 5% of the vicinal toluenediamine isomers may be present in that system. A second reason is that the weight ratio of the 2,4- and 2,6-toluenediamine isomer mix, when alkylated, provides sufficient time for formulation of urethane systems for RIM processing. The amino groups which are blocked by a methyl group or an alkenyl group, or both, are deactivated and provide extended pot life as a diamine chain extender.

The alkenylated aryldiamines described herein have a variety of uses and can be used in preparing coatings and adhesives. In constrast to currently available urethane coating systems having unsaturation therein, e.g. those containing glycerides of linseed oil or other siccative oil in an isocyanate prepolymer backbone, the unsaturation is pendant from the backbone. When the unsaturation is in the polymer backbone, as in the prior art, one may experience difficulty in obtaining desirable polymerization rates and in obtaining desirable rates for post curing of the reactive unsaturation. With the alkenylated aryldiamines, the unsaturation is pendant from the polymer backbone and permits faster post curing while still providing a desirable aromatic ring in the backbone.

The test, *Polyurethanes Chemistry and Technology* by Saunders and Frisch, (1964) has several chapters relating to the utilization of polyurethanes having unsaturation therein; such chapters include applications for coatings, adhesives, and fibers.

In addition to formulating polyurethanes or polurea elastomers, the pendant unsaturation in the alkenylated toluenediamine can be polymerized by conventional techniques with other polymerizable monomers, to enhance the physical properties of the elastomers systems. Typical monomers which may be polymerized with the pendant unsaturation include vinyl acetate, lower alkyl ($C_{1-6}$) esters of acrylic and methacrylic acid, vinyl chloride, vinylidine chloride, styrene, butadiene, isoprene, and cyclopentadiene.

One of the problems associated with effecting polymerization of the $\alpha,\gamma$-alkenylated toluenediamines with other polymerizable monomers is the relatively slow polymerization activity of the alkenylated aromatic diamine. During alkenylation, rearrangement of the double bond occurs and the double bond becomes allylic to the aromatic ring. As is known, the reactivity of the allylic double bond is low and catalyst levels and conditions may require adjustment to obtain desirable polymerization rates. In this invention, the double bond is isomerized to a conjugated relationship with the ring thus imparting higher activity to the unsaturated position.

The alkenylated toluenediamines described herein have also been found to be excellent antioxidants for oils and rubber. The high antioxidant activity coupled with synthesis based on relatively inexpensive raw materials provides for products having a desirable cost/performance ratio. The alkenylated products have been evaluated for use in hydraulic oil and natural rubber, but it is believed the antioxidant properties will be generally useful for adhesives, sealants, coatings, elastomers, plastics, and petroleum products such as hydrocarbon fuels.

The following examples are provided to illustrate preferred embodiments of the invention and are not intended to restrict the scope thereof. All parts are part by weight and all percentages are expressed as weight percent unless otherwise specified.

EXAMPLE 1

Preparation of 5-(Cyclopent-2-enyl)-2,4-toluenediamine

A 200g (1.64 mol) portion of 2,4-toluenediamine, 162g (1.23 mol, 2,45 equiv) of dicyclopentadiene, 200g (2.78 mol) of pentane, and 20.0g of an amorphous alumina-silica catalyst comprised of 13% alumina and 87% silica were charged to a 1000cc pressure vessel equipped with a mechanical stirrer. The vessel was sealed and purged with nitrogen leaving a 32 psig nitrogen blanket. The vessel contents were heated to 205° C. with stirring and were maintained at that temperature for 22 hours. The contents were cooled to 150° C. and isolated catalyst free by hot filtration. Selective removal of residual hydrocarbons by vacuum distillation and analysis by gas chromatography (GC) provides the following product mixture.

|  | GC Area % |
|---|---|
| 2,4-toluenediamine | 36.02 |
| 3-(cyclopent-2-enyl)-2,4-toluenediamine | 2.51 |
| 5-(cyclopent-2-enyl)-2,4-toluenediamine | 57.34 |
| Other Aromatic Diamine derivates including 3,5-di(cyclopent-2-enyl) 2,4-toluenediamine | 4.13 |
|  | 100.0% |

Conversion of 2,4-toluenediamine = 64%

The example shows that both positions ortho to each amine are reactive to alkenylation, but as one might expect, the 5 positions is more reactive than the 3 position. The dicyclopentadiene is cracked in situ, forming cyclopentadiene under the reaction conditions. Analysis of the hydrocarbons in the product mixture prior to distillation shows only cyclopentadiene and pentane present. No significant amounts of cyclopentadiene oligomers were formed.

EXAMPLE 2

Synthesis of 5-(Cyclopentyl-1-enyl)-2,4-toluenediamine

A 100.0g (0.51 mol) portion of 5-(cyclopent-2-enyl)-2,4-toluenediamine was added to a 2L round bottomed flask containing 10.0g (0.15 mol) of 85% potassium hydroxide, 11.0g (1.85 mole) of isopropanol, and 667cc of mixed xylenes. The mixture was stirred at room temperature under a static nitrogen atmosphere until all the potassium hydroxide had dissolved. The flask was fitted with a Claisen distillation head, a condenser and a receiving flask then warmed to 115° C. Isopropanol and water were removed over a 2 hour period. The temperature of the reaction flask was then raised to 160° C. and maintained for a period of 5 hours. During this period, the xylenes were slowly removed by atmospheric distillation. The product was then isolated from the flask by bulb-to-bulb distillation at 160°−180° C./0.5mm Hg. A 75.0g sample (75% isolated yield) of the α,β-unsaturated product was obtained with purity ≧95%.

The product gave satisfactory 'H and $^{13}$C NMR and mass spectral analyses.

EXAMPLE 3

Preparation of 3-(Cyclopent-2-enyl)-2,6-toluenediamine

A 200g (1.64 mol) portion of 2,6-toluenediamine, 162g (1.23 mol, 2.45 equiv) of dicyclopentadiene, 200g (2.78 mol) of pentane, and 20.0g of a catalyst comprised of 13% alumina and 87% silica were charged to a stirred vessel and reacted at 205° C. in a similar fashion as indicated in Example 1. Isolation of a catalyst free sample by hot filtration followed by selective removal of all residual hydrocarbon by distillation afforded the following product mixture:

|  | GC Area % |
|---|---|
| 2,6-toluenediamine | 51.32 |
| 3-(cyclopent-2-enyl)-2,6-toluenediamine | 43.67 |
| Other Aromatic Diamine including 3,5-di(cyclopent-2-enyl)-2,6-toluenediamine Derivatives | 5.02 |
|  | 100.0% |

Conversion of 2,6-toluenediamine = 49%

Example 1 and this example show that both the 2,4- and 2,6-isomer of toluenediamine are susceptible to alkenylation using an acid alumina-silica catalyst in the presence of a solvent system.

EXAMPLE 4

Synthesis of 3-(Cyclopent-1-enyl)-2,6-toluenediamine

A 15.0g (72.61 mmol) portion of 3-(cyclopent-2-enyl)-2,6-toluenediamine was added to a 250cc round bottomed flask containing 1.50g (22.7 mmol) of 85% potassium hydroxide, 16.79 (278.0 mmol) isopropanol, 100cc of mixed xylenes. The mixture was stirred at room temperature under a static nitrogen atmosphere until all the potassium hydroxide had dissolved. The flask was fitted with a Claisen distillation head, a condenser, a receiving flask and then warmed to 115°. Isopropanol and water were removed over a 2 hour period. The temperature of the reaction flask was then raised to 160° C. and maintained for a period of 5 hours. During this period, the mixed xylenes were slowly removed by atmospheric distillation. The product was then isolated from the flask by bulb-to-bulb distillation at 160°–180° C. 10.5mm Hg. An 11.5g sample (76.7% isolated yield) of the α-β-unsaturated product was obtained.

The product gave satisfactory 'H and $^{13}$C NMR and mass spectral analyses.

EXAMPLE 5

Preparation of 3-(3-Methylbut-2-enyl)-2,6-toluenediamine

A 200g (1.64 mol) portion of 2,6-toluenediamine, 167g (2.45 mol) of isoprene, 200g (2.78 mol) of pentane, and 20g of powdered H-Y zeolite were reacted at 150° C. in a similar fashion as indicated in Example 3. Isolation of a catalyst free sample was obtained by hot filtration. Selective removal of all residual hydrocarbon by vacuum distillation afforded the following product mixture:

|  | GC Area % |
|---|---|
| 2,6-toluenediamine | 50.30 |
| 3-(3-methylbut-2-enyl)-2,6-toluenediamine | 41.49 |
| Other Aromatic Diamine including 3,5-di(3-methylbut-2-enyl)-2,6-toluenediamine derivatives | 8.21 |
|  | 100.0% |

Conversion of 2,6-toluenediamine = 50%

EXAMPLE 6

Preparation of 3-(3-Methylbut-2-enyl) and 5-(3-Methylbut-2-enyl)-2,4-toluenediamine A 200g (1.64 mol) portion of 2,4-toluenediamine, 167g (2.45 mol) of isoprene, 200g (2.78 mol) pentane, and 20g of catalyst comprised of 13% alumina and 87% silica were reacted at 200° C. in a similar fashion as indicated in Example 5. Isolation of catalyst free sample was accomplished by hot filtration. Selective removal of all residual low boiling hydrocarbons by vacuum distillation afforded the following product mixture:

|  | GC Area % |
|---|---|
| 2,4-toluenediamine | 60.38 |
| 3-(3-methylbut-2-enyl)-2,4-toluenediamine | 12.23 |
| 5-(3 methylbut-2-enyl)-2,4-toluenediamine | 16.01 |
| Other Aromatic Diamine derivatives including 3,5-di(3-methylbut-2-enyl)-2,4-toluenediamine derivatives | 11.38 |

Conversion of 2,4-toluenediamine = 40%
The 2-enyl derivative can be isomerized as in Example 2 and 4 to produce the α,β-unsaturation.

EXAMPLE 17

Preparation of 4-(Cyclopent-2-enyl)-1,3-phenylenediamine

A 200g (1.85 mol) portion of 1,3-phenylenediamine, 183 g (1.39 mol, 2.77 equiv.) of dicyclopentadiene, 225g (3.14 mol) of pentane, and 20g of an amorphous alumina-silica catalyst comprised of 13% alumina and 87% silica were charged to a 1000 cc pressure vessel equipped with a mechanical stirrer. The vessel was sealed and purged with nitrogen leaving a 35 psig nitrogen blanket. the vessel contents were heated to 215° C. with stirring and were maintained at that temperature for 22 hr. Initial reaction pressure was 522 psig. The contents were cooled to 150° C. and isolated catalyst free by hot filtration. Selective removal of residual cyclopentadiene and pentane by vacuum distillation and analysis by gas chromatography (GC) revealed the following product mixture:

|  | Wt % |
|---|---|
| 1,3-phenylenediamine | 53.11 |
| 4-(cyclopent-2-enyl)-1,3-phenylenediamine | 40.31 |
| 4,6-di(cyclopent-2-enyl)-1,3-phenylenediamine | 6.58 |
|  | 100% |

Conversion of 1,3-phenylenediamine = 34.5%
Isomerization can be effected by contacting with base as in Example 2 to produce α,β-unsaturation.

EXAMPLE 8

Preparation of 2-(Cyclopent-2-enyl)-1,4-phenylenediamine

A 200g (1.85 mol) portion of 1,4-phenylenediamine, 170g (1.29 mol, 2.57 equiv.) of dicyclopentadiene, 225g (3.15 mol) of pentane, and 20g of 13% alumina/87% silica catalyst were reacted in a fashion similar to example 1. The reaction was conducted at 215° C. for 20 hr. with an initial pressure of 475 psig. Product analysis by gas chromatography on hydrocarbon free sample revealed the following assay:

|  | Wt % |
|---|---|
| 1,4-phenylenediamine | 79.21 |
| 2-(cyclopent-2-enyl)-1,4-phenylenediamine | 20.79 |
|  | 100% |

Conversion of 1,4-phenylenediamine = 14.0%
Isomerization can be effected by contact with a base.

EXAMPLE 9

Cyclopent-2-enyl Derivatives of 1,2-Phenylenediamine

A 200g (1.85 mol) portion of 1,2-phenylenediamine, 183g (1.38 mol, 2.77 equiv.) of dicyclopentadiene, 226g of pentane and 20g of 13% alumina/87% silica catalyst were reacted in a fashion similar to example 1. The reaction was conducted at 215° C. for 24 hr. with an initial reaction pressure of 448 psig. Product analysis by gas chromatography on hydrocarbon free sample revealed the following assay:

|  | Wt % |
|---|---|
| 1,2-phenylenediamine | 22.94 |
| 3-(cyclopent-2-enyl)-1,2-phenylenediamine | 36.46 |
| 4-(cyclopent-2-enyl)-1,2-phenylenediamine | 24.42 |
| di(cyclopent-2-enyl)derivatives | 13.71 |
|  | 97.53% |

Conversion of 1,2-phenylenediamine = 63.7%
Isomerization of the double bond to α, β-unsaturation can be effected by contact with a basic catalyst.

EXAMPLE 10

Preparation of 1,2-Phenylenediamine/Isoprene Addition Products 1,2-Phenylenediamine (200g, 1.85 mol), 189g (2.77 mol) of isoprene, 225g (3.14 mol) of pentane and 20g of 13 wt% alumina/87 wt% silica catalyst were reacted in a fashion similar to example 1. The reaction was conducted at 200° C. for 24 hr. with an initial pressure of 426 psig. Product analysis by gas chromatography on isoprene and pentane free sample afforded by the following assay.

|  | Wt % |
|---|---|
| 1,2-phenylenediamine | 79.74 |
| 3-(1,1-dimethylprop-2-enyl)-1,2-phenylenediamine | 3.46 |
| 3-(3-methylbut-3-enyl)-1,2-phenylenediamine | 4.90 |
| 3-(3-methylbut-2-enyl)-1,2-phenylenediamine | 8.99 |
| Other mono-prenylated 1,2-phenylenediamines | 2.91 |
|  | 100% |

Conversion of 1,2-phenylenediamine = 13.5%

EXAMPLE 11

Preparation of 1,3-Phenylenediamine/Isoprene Addition Products

A 200g (1.85 mol) portion of 1,3-phenylenediamine was alkenylated with 189g (2.77 mol) of isoprene in the same manner as shown in example 10. Product analysis by gas chromatography on isoprene and pentane free sample afforded the following assay.

|  | Wt % |
|---|---|
| 1,3-phenylenediamine | 65.00 |
| 4-(3-methylbut-2-enyl)-1,3-phenylenediamine | 16.27 |
| Other mono-ring-prenylated 1,3-phenylenediamines | 10.70 |
|  | 91.97% |

Conversion of 1,3-phenylenediamine = 20.5%
Isomerization of the double bond can be effected by contacting with a basic catalyst.

EXAMPLE 12

Antioxidant Testing in Hydraulic Oil

The test candidate toluenediamines, were evaluated for antioxidant properties for hydraulic oil. The evaluation was performed by the ASTM method D2272-67 entitled "Oxidation Stability of Steam Turbine Oils by Rotating Bomb" using Sunvis 21 (a light hydraulic oil) as the test oil. A good antioxidant will have an oxidation inhibition time (RBOT) greater than 150 min. at 0.5 wt. % utilization.

| TEST COMPOUND | RBOT TIME MINUTES |
|---|---|
| Control Medium - Sunvis 21 Mineral Oil | 33 |
| 2-(cyclopent-2-enyl)-aniline | 92 |
| 2,4-toluenediamine | 118 |
| 2-(cyclopent-2-enyl)-1,4-phenylenediamine | 120 |
| Stalite S* | 151 |
| 80/20 mix 2,4 and 2,6-diethyltoluenediamine | 160 |
| 5-(cyclopent-1-enyl)-2,4-toluenediamine | 210 |
| 5-(cyclopent-2-enyl)-2,4-toluenediamine | 223 |
| 3-(cyclopent-1-enyl)-2,6-toluenediamine | 225 |
| 3-(cyclopent-2-enyl)-2,6-toluenediamine | 268 |
| 5-tert-butyl-2,4-toluenediamine | 277 |
| 3-(3-methylbut-2-enyl)-2,6-toluenediamine | 293 |

*a commercially available antioxidant

The cyclopent-1-enyl derivatives of toluenediamine show good antioxidant activity having oxidation inhibition times in the range of 210–225 min. at 0.5 wt. % utilization. Although not intending to be bound by theory, the data show that the excellent antioxidant activity results from the presence of an α-β-unsaturated moiety appended to the aromatic ring and the amine groups being meta to each other. However, the toluenediamine derivatives are significantly better than the para-phenylenediamine derivatives.

What is claimed is:

1. An alkenylated toluenediamine composition represented by the formula:

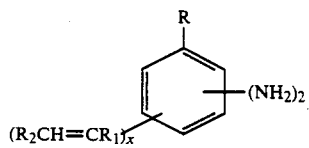

wherein R is methyl and the amine groups in the resulting toluenediamine composition are in the 2- and 4-positions or in the 2- and 6-positions and $R_1$ and $R_2$ are combined to form an alkylene radical $(CH_2)_y$ wherein $y=3$ and x is one.

2. An alkenylated phenylenediamine composition represented by the formula:

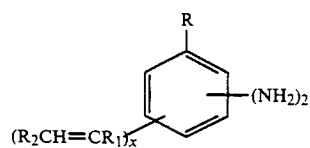

wherein R is hydrogen, x is one and $R_1$ and $R_2$ are combined to form an alkylene radical $(CH_2)_y$ wherein $y=3$.

* * * * *